US009529806B1

(12) United States Patent
Sumant et al.

(10) Patent No.: US 9,529,806 B1
(45) Date of Patent: Dec. 27, 2016

(54) METHOD AND APPARATUS FOR PERFORMING GRANULAR RESTORATION OF DATA OBJECTS FROM MACHINE IMAGES STORED ON SEQUENTIAL BACKUP MEDIA

(71) Applicant: Symantec Corporation, Mountain View, CA (US)

(72) Inventors: Tejas Sumant, Pune-Maharashtra (IN); Kirk Searls, Maitland, FL (US)

(73) Assignee: Veritas Technologies LLC, Mountain View, CA (US)

( * ) Notice: Subject to any disclaimer, the term of this patent is extended or adjusted under 35 U.S.C. 154(b) by 752 days.

(21) Appl. No.: 13/630,953

(22) Filed: Sep. 28, 2012

Related U.S. Application Data

(62) Division of application No. 12/277,264, filed on Nov. 24, 2008, now Pat. No. 8,315,983.

(51) Int. Cl.
*G06F 17/30* (2006.01)

(52) U.S. Cl.
CPC .............................. *G06F 17/30088* (2013.01)

(58) Field of Classification Search
CPC ............ G06F 17/30076; G06F 11/1446; G06F 11/1448; G06F 17/30088; G06F 11/1469; G06F 11/1453
See application file for complete search history.

(56) References Cited

U.S. PATENT DOCUMENTS

| | | | |
|---|---|---|---|
| 6,205,450 B1 * | 3/2001 | Kanome | 707/649 |
| 7,073,036 B2 * | 7/2006 | Furuya et al. | 711/162 |
| 7,302,454 B2 * | 11/2007 | Kawamura | 707/640 |
| 7,809,692 B1 * | 10/2010 | Pruthi et al. | 707/674 |
| 7,809,756 B2 * | 10/2010 | Barney et al. | 707/793 |
| 8,412,896 B1 * | 4/2013 | Chellappa et al. | 711/162 |
| 2004/0267835 A1 * | 12/2004 | Zwilling et al. | 707/202 |
| 2006/0044635 A1 * | 3/2006 | Suzuki et al. | 358/527 |
| 2007/0220214 A1 * | 9/2007 | Sandrock-Grabsky | G06F 11/1458 711/153 |
| 2009/0313447 A1 * | 12/2009 | Nguyen | G06F 11/1451 711/162 |
| 2012/0072394 A1 * | 3/2012 | Joshi et al. | 707/640 |
| 2012/0233417 A1 * | 9/2012 | Kalach et al. | 711/162 |

* cited by examiner

*Primary Examiner* — James Trujillo
*Assistant Examiner* — Fatima Mina
(74) *Attorney, Agent, or Firm* — Campbell Stephenson LLP

(57) ABSTRACT

A method and apparatus for performing granular restoration from machine images stored on sequential backup media is disclosed. In one embodiment, the method for performing granular restoration from machine images stored on sequential backup media includes processing at least one machine image file to identify at least one database file and at least one data object that is arranged within the at least one database file and generating mapping information regarding the at least one data object within the at least one machine image file, wherein the at least one machine image is to be stored on the sequential backup media.

20 Claims, 5 Drawing Sheets

METHOD AND APPARATUS FOR PERFORMING GRANULAR RESTORATION OF DATA OBJECTS FROM MACHINE IMAGES STORED ON SEQUENTIAL BACKUP MEDIA

CROSS-REFERENCE TO RELATED APPLICATIONS

The present patent application is a divisional of U.S. patent application Ser. No. 12/277,264, filed on Nov. 24, 2008, entitled "METHOD AND APPARATUS FOR PERFORMING GRANULAR RESTORATION OF DATA OBJECTS FROM MACHINE IMAGES STORED ON SEQUENTIAL BACKUP MEDIA" and is incorporated by reference herein in its entirety and for all purposes as if completely and fully set forth herein.

BACKGROUND

Field of the Invention

Embodiments of the present invention generally relate to data recovery techniques and, more particularly, to a method and apparatus for performing granular restoration of data objects from virtual and non-virtual machine images stored on sequential backup media.

Description of the Related Art

In a typical computing environment, an organization may employ any number of technologies to process, store, protect, recover, produce and secure mission critical data. For example, the organization may employ one or more data protection systems to backup and recover the mission critical data after a disaster or data corruption. Furthermore, the organization may employ one or more virtualization techniques to create one or more abstract computer resources (e.g., virtual machines, virtual applications, virtual desktops, virtual hardware devices and/or the like) from physical computer resources. Moreover, the typical computing environment may include one or more data storage systems for facilitating permanent storage, retrieval and transmission of the mission critical data throughout a computer network.

In addition, the typical computing environment may include one or more database management systems for organizing and retrieving structured data (e.g., tables) within one or more databases. For example, the one or more databases may include various data objects (e.g., emails, word documents, spreadsheets and/or the like), which are regularly backed up through the one or more data storage systems (e.g., magnetic tape drives) as one or more machine image (i.e., virtual machine or non-virtual machine image files arranged in a format, such as .VHD, .VMDK or .V2I). As the amount of data to be backed up increases, the number of backup volumes (e.g., magnetic tapes) also increases significantly.

The typical computing environment may provide granular restoration to facilitate data recovery of individual data objects within a volume. Furthermore, system information for the volume may be brought back online and available to users at the expense of processing overhead. Currently, granular restoration is achieved by staging an entire machine image (i.e., files) from a tape drive onto a disk. Then, the machine image is mounted in order to extract individual data objects. Such a conventional approach requires a significant amount of resources (e.g., processing time and storage space) for the staging process even when there is a very small amount of data to be restored. Furthermore, such a conventional approach does not apply to Virtual MICROSOFT Exchange Server protection.

Therefore, there is a need in the art for a method and apparatus for performing granular restoration of data objects from virtual and non-virtual machine images that are stored on sequential backup media.

SUMMARY OF THE INVENTION

Embodiments of the present invention comprise a method and apparatus for performing granular restoration from machine images stored on sequential backup media. In one embodiment, the method for performing a granular restoration of data objects from machine images stored on sequential backup media includes processing at least one machine image to identify at least one database and at least one data object that is arranged within the at least one database and generating mapping information regarding the at least one data object within the at least one machine image, wherein the at least one machine image is to be stored on the sequential backup media.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
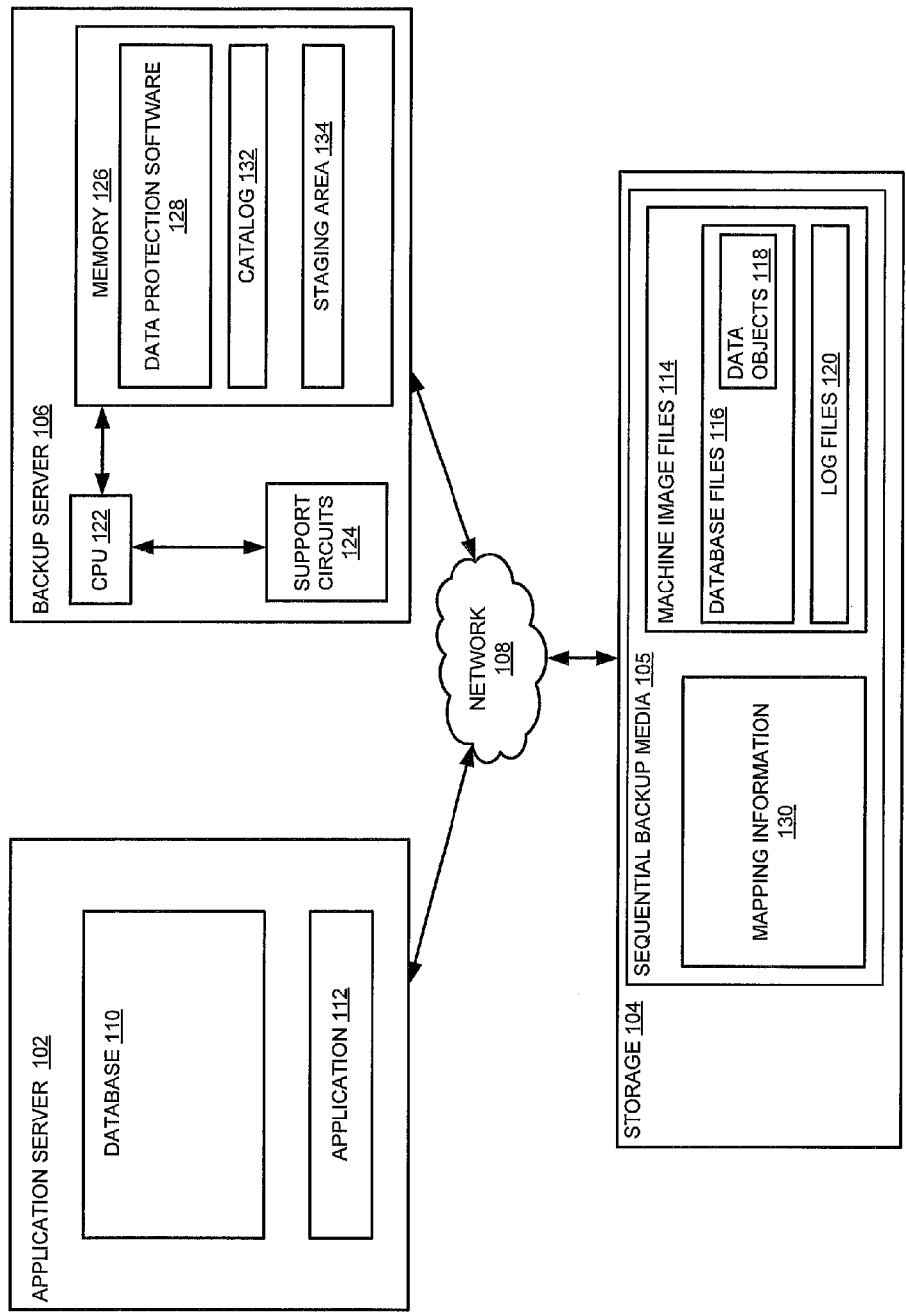
FIG. 1 is a block diagram of a system for performing granular restoration from machine images stored on sequential backup media in accordance with one or more embodiments of the present invention.

FIG. 1 is a block diagram of a system 100 for performing granular restoration from machine images stored on sequential backup media according to one or more embodiments of the present invention. The system 100 comprises an application server 102, storage 104 and a backup server 106, where each is coupled to each other through a network 108. Alternatively, it is appreciated that the system 100 may be a local computing environment where the backup server 106 is coupled to the storage 104 without the network 106. In other words, one or more embodiments may include the storage 104 that is locally attached to the backup server 106 (e.g., a local hard drive).

The application server 102 is a type of computing device (e.g., a laptop, a desktop, a Personal Digital Assistant (PDA) and/or the like), such as those generally known in the art. The application server 102 hosts an application 112 for one or more client computers. In one embodiment, the application server 102 includes a database 110 (i.e., a database management system for one or more files in an aggregate data type format, such as .EDB files for MICROSOFT Exchange). Generally, the database 110 includes a collection of files, organized in such a manner that database software may easily and quickly retrieve one or more files. In some embodiments, the database 110 includes multiples segments of equal size where each segment is commonly referred to as a page.

The database 110 may be a system that manages various files (e.g., emails, word documents, spreadsheets, and/or the like), which are regularly backed up through the one or more data storage systems (e.g., magnetic tape drives) as the machine image files 114. In one embodiment, the database 110 stores data that may be utilized by the application 112. For example, the database 110 may be a MICROSOFT Exchange database that stores various data objects (e.g., emails, journal entries, notes, mailboxes, calendar events and/or the like) to be provided to the one or more client computers by MICROSOFT Exchange Server.

The storage 104 generally includes various components (i.e., hardware and software) that are configured to manage storage resources within a computing environment. The storage 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the application server 102 and/or the backup server 106. According to one or more embodiments, the storage 104 facilitates permanent storage (i.e., backup) of critical computer data on sequential backup media 105. For example, one or more machine image files 114 and mapping information 130 may be streamed to the sequential backup media 105. As explained further below, the machine image files 114 further include one or more database files 116 and one or more log files 120. The database files 116 further include one or more data objects 118 (e.g., documents, emails, journal entries, notes, mailboxes, calendar events and/or the like).

The backup server 106 is a type of computing device (e.g., a laptop, a desktop, a Personal Digital Assistant (PDA) and/or the like), such as those generally known in the art. The backup server 106 includes a CPU 122, support circuits 124, and a memory 126. The CPU 122 may comprise one or more commercially available microprocessors or microcontrollers that facilitate data processing and storage. The support circuits 124 facilitate the operation of the CPU 122 and include one or more clock circuits, power supplies, cache, input/output circuits, and the like. The memory 126 comprises at least one of a Read Only Memory (ROM), a Random Access Memory (RAM), disk drive storage, an optical storage, a removable storage, and the like. The memory 126 includes various software packages, such as data protection software 128. The memory 126 further includes various data, such as a catalog 132. The memory 126 further includes a staging area 134. In one embodiment, the data protection software 128 includes backup software programs, data recovery software programs and/or the like. In one or more embodiments, the data protection software 128 mounts the machine image files 114 in order to facilitate access to the data blocks that comprise the data objects 118.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure, such as Ethernet, WiFi, WiMax, General Packet Radio Service (GPRS), and the like.

The machine image files 114 may be one or more files of various formats for encapsulating and representing a hard disk, a block device and/or a physical machine in a proprietary format. As an example, the machine image files 114 may include one or more virtual machine image files, such as virtual hard disk (.VHD) files, VMDK files and/or the like. As another example, the machine image files 114 may include one or more non-virtual machine image files, such as a disk image (.V2I) file created by SYMANTEC BackupPExec software products. As yet another example, the machine image files 114 may include one or more snapshots of the application server 102 and/or the database 110.

The machine image files 114 may be stored as one or more backups (e.g., a full backup, an incremental backup, a differential backup and/or the like). In one or more embodiments, a particular machine image file of the machine image files 114 may be a full backup or an incremental backup of the application server 102. For example, the machine image files 114 may include a full backup and one or more incremental backups of the application server 102, which are stored sequentially on magnetic tape. As such, the full backup and the one or more incremental backups may form a backup chain in which one or more storage states of the database 110 are maintained. Furthermore, a particular incremental backup of the application server 102 includes one or more modified and/or added data blocks and indicates any deleted data blocks since a previous backup (e.g., a previous incremental backup or a base full backup).

As explained below, the machine image files 114 may be mounted to access the database files 116 and the data objects 118. The machine image files 114 include application data for the application 112, which is stored in the database files 116 according to various embodiments. The machine image files 114 may include preprocessed application data. For example, the preprocessed application may be flushed from memory to disk on the application server 102 by a Volume Shadow Copy Service (VSS) writer.

The database files 116 represent one or more storage states of the database 110 at one or more particular points-in-time according to one or more embodiments of the present invention. As such, application data managed by the database 110 is arranged into an aggregate data file format and stored as the database files 116. In one embodiment, the database files 116 may be encrypted. For example, the database files 116 may include one or more MICROSOFT Exchange Database files (e.g., EDB files) that store various emails, mailboxes, notes, journals and/or the like for one or more MICROSOFT Exchange Servers. The database files 116 further include the data objects 118 (i.e., various files and/or data items, such as emails, documents, settings, journal entries and/or the like), which may be disseminated over one or more extents (i.e., one or more contiguous data blocks in a computer memory). As explained further below, one or more data objects of the data objects 118 are selected for granular restoration and/or disaster recovery of the database 110.

The log files 120 include information regarding input/output activity associated with the database files 116 (e.g., file system and/or storage operations). In one embodiment, the log files 120 enumerate input/output activity performed during a backup. In one embodiment, the log files 120 include records of one or more write attempts to the database files 116. In one or more embodiments, the log files 120 are applied to the database files 116 by the data protection software 128 in order to facilitate point-in-time consistency among the database files 114.

According to various embodiments of the present invention, the catalog 132 stores object hierarchy information (e.g., information regarding directories and files of the file system). The object hierarchy information provides classifications for data (i.e., files within the database 110). The object hierarchy information indicates a category or a collection of categories that correspond with each data object of the data objects 118. Furthermore, the catalog 132 specifies dependencies and other relationships between ones of the objects 118. In one embodiment, the catalog 132 is examined to select a data object (e.g., a file, an email and/or the like) for granular restoration and/or disaster recovery. In addition, the catalog 132 include a pointer to the mapping information 130 (e.g., a reference to a location on the sequential backup media 105)

According to various embodiments of the present invention, the staging area 134 is a portion of the memory 126 that may be utilized to store one or more data objects of the data objects 118 that are transmitted from sequential storage media (e.g., a magnetic tape drive and/or the like). In one embodiment, one or more pages of the database files 116 that include the one or more data objects are copied to the staging area. For example, if an email is to be restored to the database 110 of the application server 102, then each and every page that includes one or more data blocks that form the email are copied to the staging area 134. Finally, the one or more data blocks are communicated to the application server 102 where the email is restored to the database 110. Subsequently, the one or more data blocks are formatted in accordance with the Messaging Application Programming Interface (MAPI) that corresponds with MICROSOFT Exchange technologies. In one embodiment, one or more MAPI functions may be used to perform the restoration of the email.

According to various embodiments of the present invention, the data protection software 128 is configured to generate the mapping information 130 to enable granular restoration of the data objects 118. In one embodiment, the data protection software 128 applies a mapping technique to the machine image files 114 to generate the mapping information 130. In one embodiment, the data protection software 128 generates one or more mappings between one or more extents (e.g., one or more contiguous portions of computer memory) of the machine image files 114 and the database files 116. Subsequently, the data protection software 128 streams the mapping information 130 to the sequential backup media 105 along with the machine image files 114. For example, the data protection software 128 may utilize a mapping service, such as VERITAS Mapping Services (VxMS) to determine locations (i.e., offsets) of the one or more extents that form the database files 116. As such, the mapping information 130 may indicate an offset of five hundred and twelve bytes for a particular database file having a size of ten megabytes. Hence, the particular database file resides in a ten megabyte block of computer memory that begins at an address that is five hundred and twelve bytes from a beginning of a particular machine image file.

In one or more embodiments, the mapping information 130 further includes database layout information that defines an arrangement of the application data (i.e., the data objects 118) within the database files 116. For example, the database layout information may be used to determine one or more mappings between one or more extents and the data objects 118. Furthermore, the data protection software 128 utilizes the database layout information to determine a hierarchy of the data objects 118 within the database files 116. Subsequently, the data protection software 128 stores information regarding the hierarchy of the data objects 118 in the catalog 132.

The data protection software 128 is configured to enable disaster recovery, granular object recovery and/or granular file recovery from virtual and/or non-virtual machine images stored in sequential storage devices (e.g., magnetic tape drives). In one embodiment, the data protection software 128 creates the machine image files 114 (i.e., the virtual and/or non virtual machine images) for the application server 102 and/or the database 110 using various virtualization and non-virtualization technologies. Subsequently, the data protection software 128 streams the machine image files 114 as backups to the sequential backup media 105 as well as the mapping information 130 as explained herein. Notably, only database pages that include application data that is to be restored are copied to the staging area 134 instead of the virtual and non-virtual machine images in entirety.

The data protection software 128 may store a full backup for which one or more incremental backups use as a base full backup in a backup chain. In one embodiment, the data protection software 128 synthesizes a full backup for a later point-in-time from the base full backup and the one or more incremental backups. As such, the data protection software 128 may apply a mapping technique to the synthesized full backup to generate the mapping information. Furthermore, the one or more incremental backups are streamed to the sequential backup media 105 in chronological order to facilitate future granular restoration. In one embodiment, object creation time information within the database files 114 may be utilized to determine one or more mappings between one or more extents on the sequential backup media 105 and one or more modified data objects.

In operation, the data protection software 128 generates the mapping information 130 to facilitate data object restoration using locations (i.e., addresses) of one or more extents that form the data objects 118. After mounting the machine image files 114, the data protection software 128 utilizes the mapping information 130 to locate and extract a data object of the data objects 118. The data object may be selected by user using the object hierarchy information stored in the catalog 132. In operation, the data protection software 128 accesses one or more data blocks that form the data object from the machine image files 114. Subsequently, the data protection software 128 stores the one or more data blocks in the staging area 134 to be restored to the database 110 of the application server 102. As such, the data object restoration may be performed without extracting the database files 116 or staging the machine image files 114 off the sequential backup media 105.

In one embodiment, the data protection software 128 copies one or more pages of the database files 114 that include the one or more data blocks to the staging area 134. Once the one or more pages are stored, the data protection software 118 formats the one or more data blocks to be restored to the application server 102. In one embodiment, the one or more data blocks are formatted in accordance with an Application Programming Interface (API) that corresponds with the application 112. Subsequently, the data protection software 128 uses one or more API functions to restore the data object to the database 110. For example, a particular data object (e.g., an email, a journal entry and/or the like) in a MICROSOFT Exchange database file is formatted for restoration through MAPI as explained above.

In another embodiment, the data protection software 128 accesses the one or more data blocks that form the data object from a full backup and/or one or more incremental backups. As explained above, the machine image files 114 may be streamed to sequential backup media (e.g., the sequential backup media 105 of FIG. 1) by the data protection software 118 as a backup chain. In reverse chronological order, the data protection software 128 processes the one or more incremental backups and accesses the one or more data blocks. The data protection software 128 halts when each and every data block of the one or more data blocks is extracted or after the full backup is processed according to one embodiment.

Figure 2:
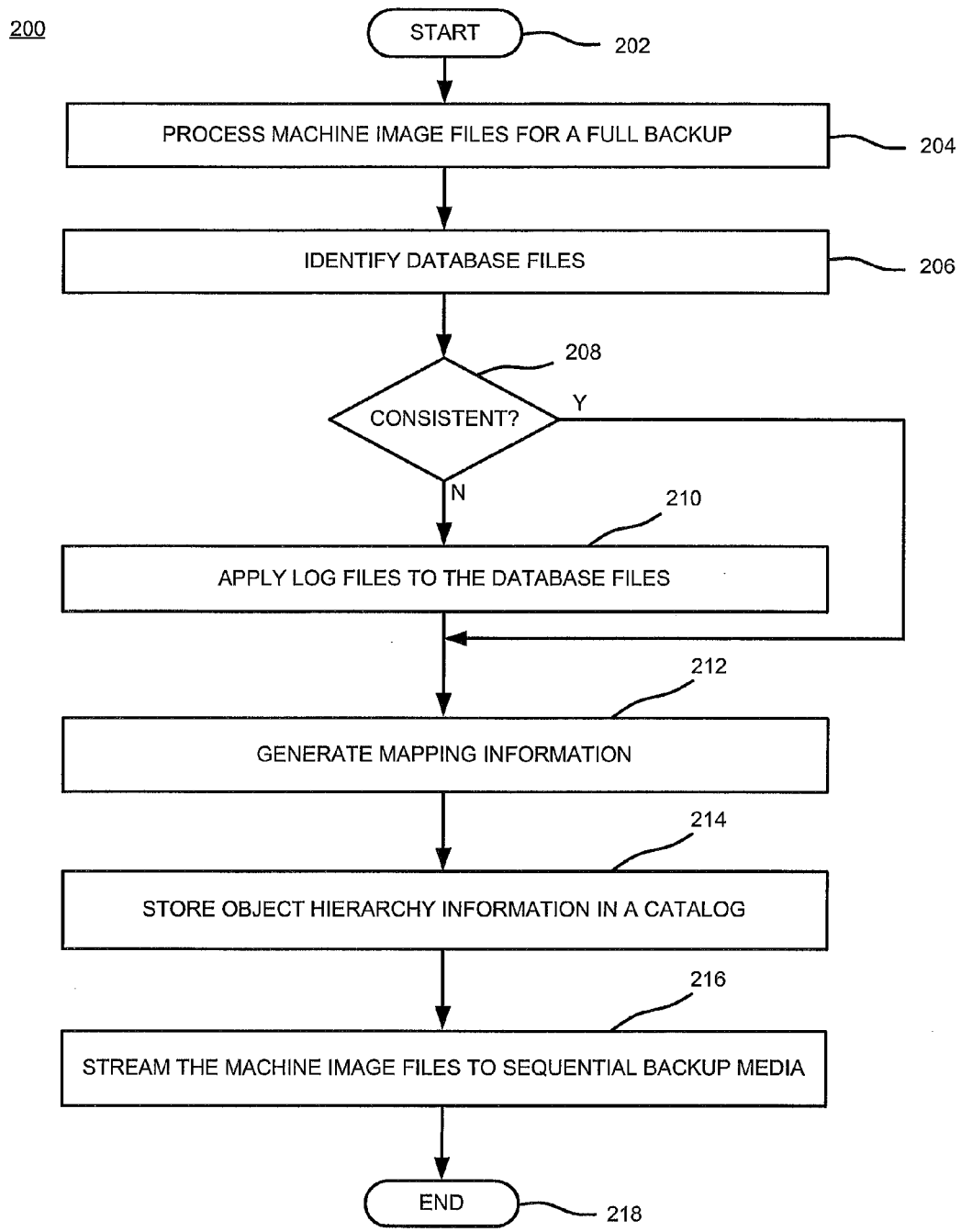
FIG. 2 is a flow diagram of a method for performing granular restoration from a full backup in accordance with one or more embodiments of the present invention.

FIG. 2 is a flow diagram of a method for performing granular restoration of a data object from a full backup in accordance with one or more embodiments of the present invention. The method 200 starts at step 202 and proceeds to step 204, at which machine image files (e.g., the machine image files 114 of FIG. 1) for a full backup are processed.

At step 206, database files (e.g., the database files 116 of FIG. 1) are identified. In an embodiment, the machine images are processed to identify the database files. At step 208, a determination is made as to whether the database files 116 are point-in-time consistent. If it is determined that the database files 116 are point-in-time consistent (option "YES"), then the method 200 proceeds to step 212. If at step 208, it is determined that the database files 116 are not point-in-time consistent, (option "NO") then the method 200 proceeds to step 210. At step 210, the log files are applied to the database files. At step 212, mapping information (e.g., the mapping information 130 of FIG. 1) is generated. In one embodiment, the mapping information indicates one or more mappings between one or more extents of the machine image files and the database files. In another embodiment, the mapping information further includes one or more mappings between one or more extents of the machine image files and the data objects.

The method 200 proceeds to step 214, at which object hierarchy information is stored in a catalog (e.g., the catalog 132 of FIG. 1). In an embodiment, the object hierarchy information provides classifications for data (i.e., files within the database 110). At step 216, the machine image files (e.g., the machine image files 114 of FIG. 1) and the mapping information 130 are streamed to a sequential backup media. The method 200 proceeds to step 218, at which, the method 200 ends.

Figure 3:
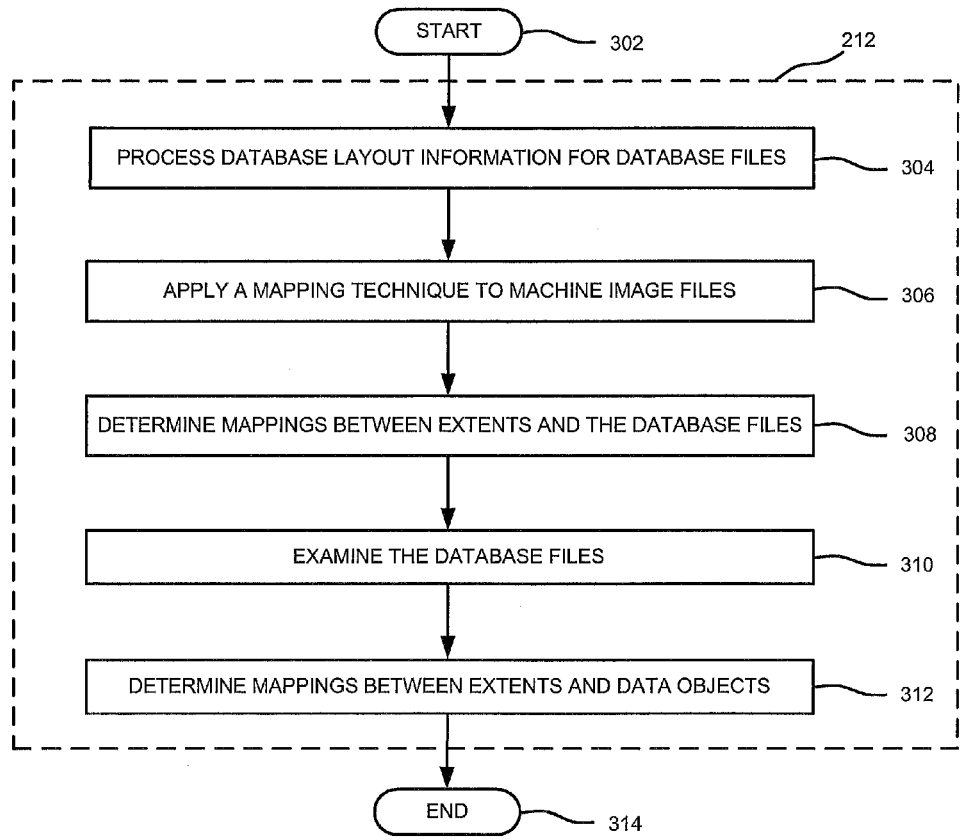
FIG. 3 is a flow diagram of a method for generating mapping information in accordance with one or more embodiments of the present invention.

FIG. 3 is a flow diagram of a method 300 for generating the mapping information in accordance with one or more embodiments of the present invention. In an embodiment of the present invention, the method 300 provides the functionality of the step 212 of the method 200. The method 300 starts at step 302 and proceeds to step 304, at which database layout information for the database files (e.g., the database files 116 of FIG. 1) is processed.

At step 306, a mapping technique is applied to the machine image files (e.g., the machine image files 114 of FIG. 1). At step 308, mappings are determined between extents and the database files (e.g., the database files 116 of FIG. 1). At step 310, the database files are examined. The method 300 proceeds to step 312, at which mappings are determined between the extents and the data objects (e.g., the data objects 118 of FIG. 1). The method 300 proceeds to step 314, at which, the method 300 ends.

Figure 4:
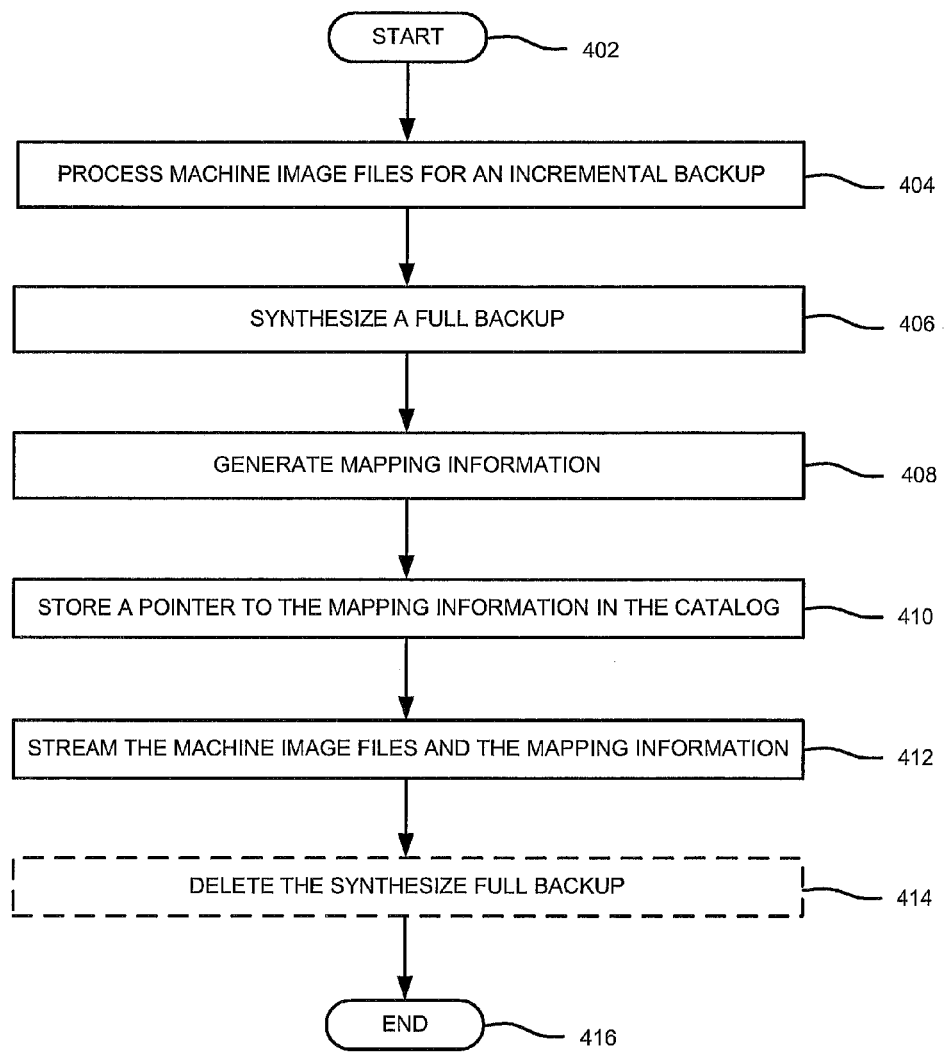
FIG. 4 is a flow diagram of a method for performing granular restoration from an incremental backup in accordance with one or more embodiments of the present invention.

FIG. 4 is a flow diagram of a method 400 for performing granular restoration from an incremental backup in accordance with one or more embodiments of the present invention. The method 400 starts at step 402 and proceeds to step 404, at which machine image files (e.g., the machine image files 114 of FIG. 1) are processed for an incremental backup.

At step 406, a full backup is synthesized. At step 408, the mapping information (e.g., the mapping information 130 of FIG. 1) is generated. In one embodiment, data object creation information is examined to determine one or more mappings for modified data blocks. Subsequently, the mapping information is streamed to the sequential backup media. At step 410, a pointer to the mapping information is stored in the catalog. The method 400 proceeds to step 412, at which the machine image files are streamed to the sequential backup media. At optional step 414, the synthesized full backup is deleted. Then, the method 400 proceeds to step 416, at which, the method 400 ends. In one embodiment, after step 412, the method 400 proceeds to step 416, at which, the method 400 ends.

Figure 5:
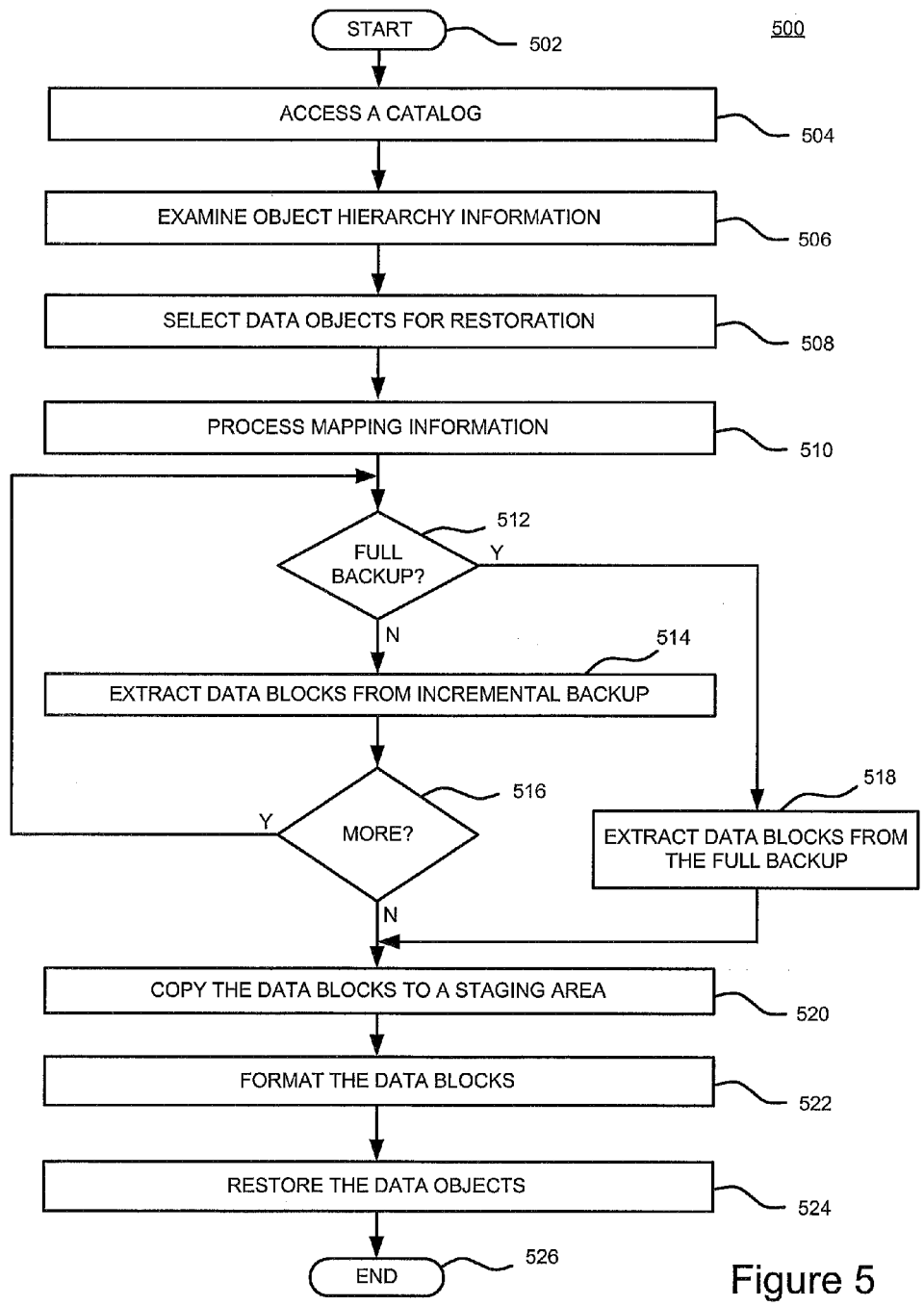
FIG. 5 is a flow diagram of a method for performing granular restoration from machine images stored on sequential backup media in accordance with one or more embodiments of the present invention.

FIG. 5 is a flow diagram of a method 500 for performing granular restoration from machine images stored on sequential backup media in accordance with one or more embodiments of the present invention. The method 500 starts at step 502 and proceeds to step 504, at which a catalog (e.g., the catalog 132 of FIG. 1) is accessed.

At step 506, object hierarchy information is examined. In an embodiment, the object hierarchy information provides classifications for data (i.e., data objects within the database 110) and is stored in the catalog. At step 508, one or more data objects (e.g., the objects 118 of FIG. 1) are selected for restoration. At step 510, mapping information (e.g., the mapping information 130 of FIG. 1) is processed. At step 512, a determination is made as to whether a full backup is required. If it is determined that the full backup is required (option "YES") then the method 500 proceeds to step 518. At step 518, the data blocks are extracted from the full backup. If at step 512, it is determined that the full backup is not required (option "NO"), then the method 500 proceeds to step 514. At step 514, the data blocks are extracted from an incremental backup.

At step 516, a determination is made as to whether more data blocks are to be extracted. If it is determined that more data blocks are to be extracted (option "YES") then the method 500 proceeds to step 512. If at step 516, it is determined that no more data blocks are to be extracted (option "NO"), then the method 500 proceeds to step 520. At step 520, the data blocks are copied to a staging area (e.g., the staging area 134 of FIG. 1). In one embodiment, the staging area stores the machine image files (e.g., the machine image files 114 of FIG. 1). At step 522, the data blocks are formatted. The method 500 proceeds to step 524, at which the data objects are restored. The method 500 proceeds to step 526, at which, the method 500 ends.

The various embodiments of methods and apparatus advantageously provide an efficient and rapid data backup and restoration solution. Further, various embodiments of the present invention provide recovery out of both the virtual machine image as well as the non virtual machine image. The embodiments of the present invention provide disaster recovery of the virtual machine, full recovery of the database, and granular recovery of individual objects out of a single image through a single backup.

While the foregoing is directed to embodiments of the present invention, other and further embodiments of the invention may be devised without departing from the basic scope thereof, and the scope thereof is determined by the claims that follow.

What is claimed is:

1. A method comprising:
   processing at least one machine image file to identify at least one database file and at least one data object that is arranged within the at least one database file; and
   generating mapping information regarding the at least one data object within the at least one machine image file, wherein
      the at least one machine image file is to be stored on sequential backup media, during a backup operation,
      the at least one machine image file comprises the at least one database file as a result of performing the backup operation, and
      the mapping information allows the at least one data object to be restored from the at least one machine image file, after the at least one machine image file has been stored on the sequential backup media, without mounting the at least one machine image file.

2. The method of claim 1, wherein the generating the mapping information further comprises:
   determining at least one mapping between at least one extent of the at least one machine image file and the at least one data object of the at least one database file.

3. The method of claim 1, wherein the generating the mapping information further comprises:
   determining at least one mapping between at least one extent of the at least one machine image file and the at least one database file.

4. The method of claim 1, further comprising:
   applying a log file to the at least one database file in response to determining that the database file is not point-in-time consistent.

5. The method of claim 1, further comprising:
   streaming the at least one machine image file to the sequential backup media.

6. The method of claim 1, further comprising:
   accessing at least one data block from the at least one machine image file using the mapping information, wherein the at least one data block forms a data object of the at least one data object.

7. The method of claim 6, further comprising:
   storing at least one page of the at least one database file that comprises the at least one data block on a staging area.

8. The method of claim 7, further comprising:
   formatting the at least one data block for restoration through an application programming interface that corresponds with the at least one database file.

9. The method of claim 1, wherein the generating the mapping information further comprises:
   generating a first set of mapping information that identifies a location of the at least one database file in the at least one machine image file; and
   generating a second set of mapping information that identifies a location of the at least one data object in the at least one machine image file.

10. A non-transitory computer readable storage medium storing program instructions executable to:
    process at least one machine image file to identify at least one database file and at least one data object that is arranged within the at least one database file; and
    generate mapping information regarding the at least one data object within the at least one machine image file, wherein
       the at least one machine image file is to be stored on sequential backup media, during a backup operation,
       the at least one machine image file comprises the at least one database file as a result of performing the backup operation, and
       the mapping information allows the at least one data object to be restored from the at least one machine image file, after the at least one machine image file has been stored on the sequential backup media, without mounting the at least one machine image file.

11. The non-transitory computer readable storage medium of claim 10, wherein the program instructions are further executable to:
    apply a log file to the at least one database file in response to determining that the at least one database file is not point-in-time consistent.

12. The non-transitory computer readable storage medium of claim 10, wherein the program instructions are further executable to:
    access at least one data block from the at least one machine image file using the mapping information, wherein
       the at least one data block forms a data object of the at least one data object.

13. The non-transitory computer readable storage medium of claim 10, wherein the program instructions are further executable to:
    store at least one page of the at least one database file that comprises the at least one data block on a staging area.

14. The non-transitory computer readable storage medium of claim 10, wherein the program instructions are further executable to:
    format the at least one data block for restoration through an application programming interface that corresponds with the at least one database file.

15. The non-transitory computer readable storage medium of claim 10, wherein the program instructions executable to generate the mapping information further comprise program instructions executable to:
    generate a first set of mapping information that identifies a location of the at least one database file in the at least one machine image file; and
    generate a second set of mapping information that identifies a location of the at least one data object in the at least one machine image file.

16. A system comprising:
    one or more processors; and
    a memory coupled to the one or more processors, wherein the memory stores program instructions executable by the one or more processors to:
       process at least one machine image file to identify at least one database file and at least one data object that is arranged within the at least one database file, and
       generate mapping information regarding the at least one data object within the at least one machine image file, wherein
          the at least one machine image file is to be stored on sequential backup media, during a backup operation, the at least one machine image file comprises the at least one database file as a result of performing the backup operation, and the mapping information allows the at least one data object to be restored from the at least one machine image file, after the at least one machine image file has been stored on the sequential backup media, without mounting the at least one machine image file.

17. The system of claim 16, wherein the program instructions are further executable to:

apply a log file to the at least one database file in response to determining that the at least one database file is not point-in-time consistent.

18. The system of claim 16, wherein the program instructions are further executable to:

access at least one data block from the at least one machine image file using the mapping information, wherein the at least one data block forms a data object of the at least one data object.

19. The system of claim 16, wherein the program instructions are further executable to:

store at least one page of the at least one database file that comprises the at least one data block on a staging area.

20. The system of claim 16, wherein the program instructions executable to generate the mapping information further comprise program instructions executable to:

generate a first set of mapping information that identifies a location of the at least one database file in the at least one machine image file, and generate a second set of mapping information that identifies a location of the at least one data object in the at least one machine image file.

* * * * *